(12) United States Patent
Idehara

(10) Patent No.: US 7,064,854 B2
(45) Date of Patent: Jun. 20, 2006

(54) IMAGE FORMING SYSTEM AND DEVICE, AND CONTROL METHOD AND CONTROL PROGRAM FOR CONTROLLING IMAGE FORMING DEVICE

(75) Inventor: Takenori Idehara, Osaka (JP)

(73) Assignee: Minolta Co., Ltd., Osaka (JP)

( * ) Notice: Subject to any disclaimer, the term of this patent is extended or adjusted under 35 U.S.C. 154(b) by 616 days.

(21) Appl. No.: 10/040,380

(22) Filed: Jan. 9, 2002

(65) Prior Publication Data

US 2002/0089694 A1    Jul. 11, 2002

(30) Foreign Application Priority Data

Jan. 11, 2001   (JP)   ............... 2001-004087

(51) Int. Cl.
*B14F 1/00*   (2006.01)
(52) U.S. Cl. .............. 358/1.15; 358/1.14; 395/113; 395/114; 399/70; 399/94
(58) Field of Classification Search ............ 358/1.15, 358/1.14; 395/114, 113; 455/38.3, 434, 455/38.01, 3.01; 345/179
See application file for complete search history.

(56) References Cited

U.S. PATENT DOCUMENTS

| 6,172,762 B1 | 1/2001 | Uchiyama ................. 358/1.14 |
| 2002/0054330 A1* | 5/2002 | Jinbo et al. ............... 358/1.15 |

* cited by examiner

*Primary Examiner*—Kimberly Williams
*Assistant Examiner*—Satwant Singh
(74) *Attorney, Agent, or Firm*—Morrison & Foerster LLP

(57) ABSTRACT

The image forming system includes a digital copying machine 1 and portable terminals 2. The digital copying machine 1 has a wireless communication unit 40, which is wirelessly communication with the portable terminals 2. The digital copying machine 1 identifies a portable terminal located closest to the digital copying machine 1 out of multiple portable terminals 2 that are in communicable conditions. As the distance between the identified portable terminal 2 and the digital copying machine 1 reduces, the temperature of heating rollers 31 is controlled to rise.

15 Claims, 12 Drawing Sheets

FIG. 5

| PORTABLE TERMINAL | OWNING USER | USAGE FREQUENCY |
|---|---|---|
| 2a | USER A | 10 |
| 2b | USER B | 8 |
| 2c | USER C | 0 |
| 2d | USER D | 2 |
| 2e | USER E | 0 |

FIG. 6

| INTENSITY OF RECEIVED RADIO WAVES | DISTANCE BETWEEN PORTABLE TERMINAL AND DIGITAL COPYING MACHINE |
|---|---|
| 0.00004 - 0.1 MILLIWATT | 10 - 500 METERS |
| 0.1 - 0.4 MILLIWATT | 5 - 10 METERS |
| 0.4 - 1.1 MILLIWATTS | 3 - 5 METERS |
| 1.1 - 10 MILLIWATTS | 0 - 3 METERS |

FIG. 7

| DISTANCE BETWEEN PORTABLE TERMINAL AND DIGITAL COPYING MACHINE | TEMPERATURE OF FUSING ROLLERS |
|---|---|
| OVER 500 METERS | HEATER OFF |
| 10 - 500 METERS | 50 °C |
| 5 - 10 METERS | 100 °C |
| 3 - 5 METERS | 130 °C |
| 0 - 3 METERS | 145 °C |

| PORTABLE TERMINAL | OWNING USER | USAGE FREQUENCY |
|---|---|---|
| 6a | USER A | 10 |

FIG. 13

| INTENSITY OF RECEIVED RADIO WAVES | DISTANCE BETWEEN PORTABLE TERMINAL AND COMPUTER |
|---|---|
| 0.00004 - 0.1 MILLIWATT | 10 - 500 METERS |
| 0.1 - 0.4 MILLIWATT | 5 - 10 METERS |
| 0.4 - 1.1 MILLIWATTS | 3 - 5 METERS |
| 1.1 - 10 MILLIWATTS | 0 - 3 METERS |

FIG. 14

| DISTANCE BETWEEN PORTABLE TERMINAL AND COMPUTER | TEMPERATURE OF FUSING ROLLERS |
|---|---|
| OVER 500 METERS | HEATER OFF |
| 10 - 500 METERS | 50 °C |
| 5 - 10 METERS | 100 °C |
| 3 - 5 METERS | 130 °C |
| 0 - 3 METERS | 145 °C |

| DISTANCE BETWEEN PORTABLE TERMINAL AND COMPUTER | TEMPERATURE OF FUSING ROLLERS IN THE PRINTER 7a | TEMPERATURE OF FUSING ROLLERS IN THE PRINTER 7b |
|---|---|---|
| OVER 500 METERS | HEATER OFF | HEATER OFF |
| 10 - 500 METERS | 50 °C | HEATER OFF |
| 5 - 10 METERS | 100 °C | HEATER OFF |
| 3 - 5 METERS | 130 °C | HEATER OFF |
| 0 - 3 METERS | 145 °C | 50 °C |

IMAGE FORMING SYSTEM AND DEVICE, AND CONTROL METHOD AND CONTROL PROGRAM FOR CONTROLLING IMAGE FORMING DEVICE

This application is based on Japanese Patent Application No. 2001-4087 filed on Jan. 11, 2001, the contents of which are hereby incorporated by reference.

BACKGROUND OF THE INVENTION

1. Field of the Invention

The present invention relates to a system comprising a portable terminal and an image forming device, in particular, to power saving technology for the image forming device. The present invention further relates to a system comprising an image forming device, a portable terminal and a control device for controlling the image forming device.

2. Description of Related Art

Concerning digital copying machines, printers and other image forming devices, a control technology is known for automatically switching the image forming device to power saving mode in order to reduce power consumption during the standby period when printing process and other operations are not performed for some time. For example, the control technology is applied to an image forming device of electro-photographic type having a fusing unit that fixes toner on paper.

In this conventional control technology, however, the image forming device cannot start printing immediately when the user operates or gives a printing instruction, if the image forming device is in the power saving mode, until the fusing unit is warmed up to a predetermined temperature with the help of a heater provided on the fusing unit. Therefore, the user has to wait extra time until the image forming device becomes ready to start the printing operation.

SUMMARY OF THE INVENTION

An object of the present invention is to provide an image-forming system, an image forming device, and control method as well as control program for controlling an image forming device, that can reduce the power consumption of the image forming device without seriously affecting the efficiency of printing work.

According to an aspect of the invention, an image forming system has portable terminals and an image forming device. The portable terminals are each equipped with a wireless communication unit capable of wirelessly communicating with the image forming device. The image forming device has a wireless communication unit capable of wirelessly communicating with the portable terminals, an identifying unit for identifying a portable terminal located closest to the image forming device out of portable terminals under wirelessly communicable conditions, and a power saving control unit for performing power saving control for the image forming device in correspondence with the distance between the identified portable terminal and the image forming device.

According to another aspect of the invention, an image forming device has a communication unit for communicating wirelessly with a portable terminal, and a controller. The controller executes the steps of obtaining distance between the portable terminal and the image forming device based on result of communication performed by communication unit, and performing power saving control for the image forming device in accordance with the obtained distance.

According to still another aspect of the invention, an image forming system has an image forming device, portable terminals, and a control device for controlling the image forming device. The portable terminals are each equipped with a wireless communication unit capable of wirelessly communicating with the control device. The control device has a wireless communication unit capable of wirelessly communicating with the multiple portable terminals, an identifying unit for identifying a portable terminal of a preregistered user out of portable terminals under wirelessly communicable conditions, and a power saving control unit for performing power saving control for the image forming device in correspondence with the distance between the identified portable terminal and the image forming device.

This invention improves the power saving control for the image forming device. This invention can reduce the consumption of the image forming device without seriously affecting the efficiency of printing work. If the distance between the image forming device and the portable terminal does not change after a predetermined length of time has passed, the power saving control is performed preferably in accordance with the distance between another portable terminal and the image forming device. The power consumption reduction amount can be increased by this method. Moreover, the power saving control can be performed in accordance with the distance between the preregistered portable terminal and the image forming device.

BRIEF DESCRIPTION OF THE DRAWINGS

FIG. 5 is a table showing the usage frequency stored in the RAM shown in FIG. 4;

FIG. 6 is the first table stored in the ROM shown in FIG. 4;

FIG. 7 is the second table stored in the ROM shown in FIG. 4;

FIG. 13 is the third table stored in the ROM shown in FIG. 11;

FIG. 14 is the fourth table stored in the ROM shown in FIG. 11;

DESCRIPTION OF THE PREFERRED EMBODIMENTS

Preferred embodiments of the invention will be described below with reference to the accompanying drawings.

(Embodiment 1)

In the first embodiment, a case is described where the present invention is applied to an image forming system having a digital copying machine. In the present embodiment, temperature control is performed for a fusing unit in accordance with the distance between the portable terminal and the digital copying machine as one type of power saving control.

Figure 1:
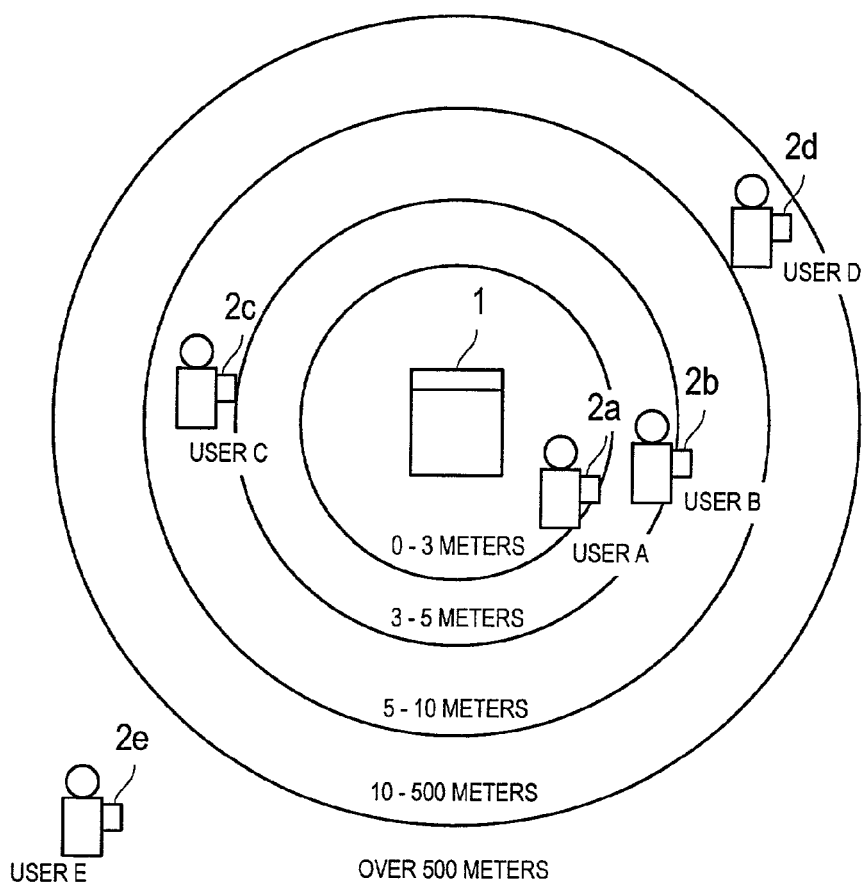
FIG. 1 is a diagram showing an example operating condition of a digital copying machine in the first embodiment.

FIG. 1 is an example of the operating condition of a digital copying machine 1. The digital copying machine 1 is capable of wireless communication with multiple portable terminals 2a through 2e. A reference number 2 denotes an arbitrary terminal. The portable terminal 2 performs function of transmitting the identification information and informing the location of itself. The portable terminal 2 is a digital communication medium such as a PHS® (Personal Handy-phone System), a cellular phone, or a PDA. The portable terminal 2 wirelessly transmits data such as voice and telephone numbers as digital signals as radio waves.

In the case shown in FIG. 1, the user A has a portable terminal 2a. Similarly, the users B, C, D and E have portable terminals 2b, 2c, 2d and 2e respectively. The user A is 0 to 3 meters away from the digital copying machine 1. The users B, C, D and E are 3 to 5 meters, 5 to 10 meters, 10 to 500 meters and over 500 meters away from the digital copying machine 1.

Figure 2:
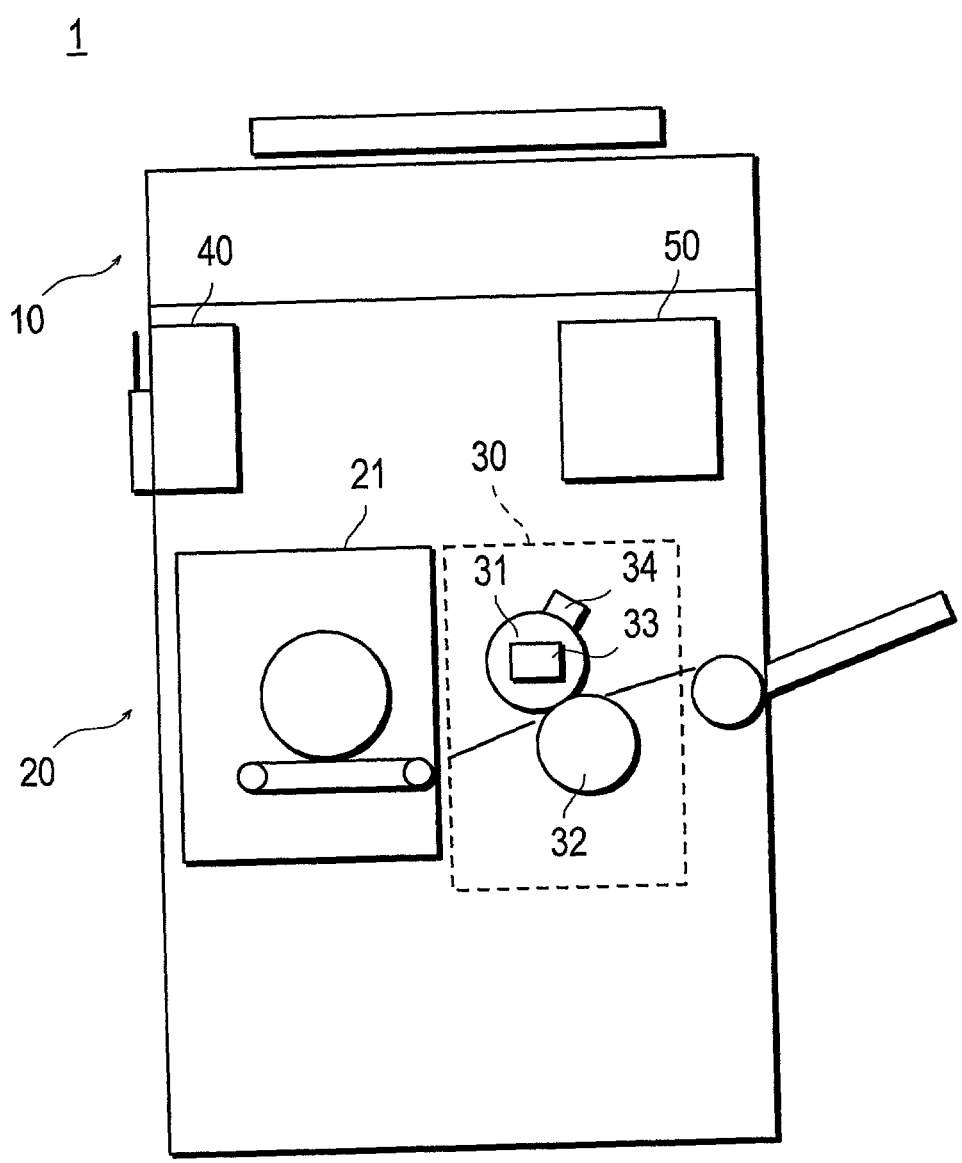
FIG. 2 is a schematic diagram showing the overall constitution of the digital copying machine in the first embodiment.

FIG. 2 is a schematic diagram showing the overall constitution of the digital copying machine 1. The digital copying machine 1 has an image reader unit 10, a printer unit 20, a wireless communication unit 40 and a control unit 50. The printer unit 20 has a toner image forming unit 21 and a fusing unit 30. The fusing unit 30 is equipped with a pair of fusing rollers 31 and 32. A heater 33 is provided on the fusing roller 31. A temperature sensor 34 detects the surface temperature of the fusing roller 31.

The image reader unit 10 reads an original image and generates image data. The toner image forming unit 21 forms a toner image on the surface of a sheet of printing paper based on the formed image data. The sheet of paper formed with the toner image is transported to the fusing unit 30. The paper is transported forward in the fusing unit 30 as it is pinched and pressed between the fusing rollers 31 and 32.

The fusing roller 31 is heated up to a predetermined temperature by a heater 33. This predetermined temperature is called the "fusing temperature." The fusing temperature may vary depending on the specification of the digital copying machine. For example, the fusing temperature in the present embodiment is 145° C. A temperature sensor 34 detects the actual temperature of the fusing roller 31 and outputs the detected result to the control unit 50.

The wireless communication unit 40 wirelessly communicates with the portable terminal 2. The control unit 50 controls the temperature of the fusing roller 31 in accordance with the distance between the portable terminal 2 and the digital copying machine 1. The control unit 50 controls the overall operation of the digital copying machine 1 based on the input of the operating panel (not shown) provided on the top surface of the digital copying machine 1. The user enters copying instructions and copying conditions through the operating panel.

Figure 3:
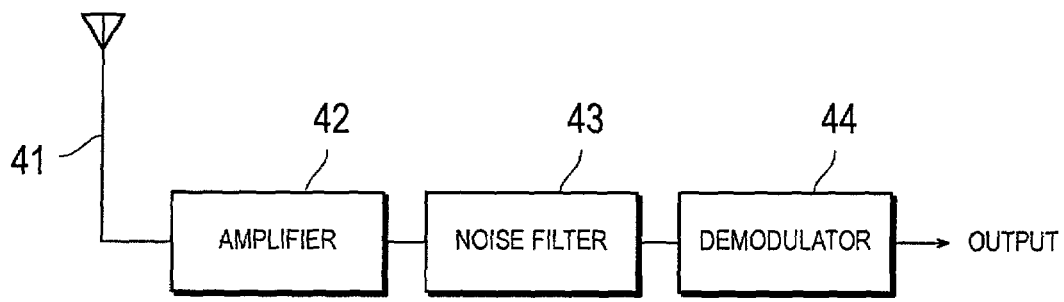
FIG. 3 is a block diagram showing the constitution of the wireless communication unit provided in the digital copying machine shown in FIG. 2.

FIG. 3 is a block diagram showing the constitution of the wireless communication unit 40 shown in FIG. 2.

The wireless communication unit 40 has an antenna 41, an amplifier 42, a noise filter 43, and a demodulator 44. The antenna 41 receives the radio waves transmitted by the portable terminal 2 and converts them to electrical signals. The amplifier 42 amplifies the electrical signals to an appropriate intensity. The noise filter 43 cuts off electrical signals weaker than a certain intensity level. The demodulator 44 demodulates the electrical signals subjected to cutoff process to obtain necessary electrical signals.

The intensity of the radio waves transmitted by the portable terminal 2 is substantially constant. Therefore, the intensity of radio waves received by the digital copying machine 1 is dependant on the distance between the portable terminal 2 and the digital copying machine 1 (more specifically the wireless communicating unit 40). As the distance between them increases, the intensity of the received radio waves reduces.

For example, if it is assumed that a radio wave transmitted by the portable terminal 2, which is 1 meter away from the digital copying machine 1, arrives at the digital copying machine 1 with an intensity of 10 mW, the radio wave transmitted by the portable terminal 2, which is 500 meter away from the digital copying machine, arrives at the digital copying machine 1 with the intensity of 0.00004 mW (=10 mW÷$500^2$). Therefore, the gain of the amplifier 42 is set in such a way that the electrical signal obtained by converting a received radio wave having an intensity lower than 0.00004 mW will be cut off by the noise filter 43, the wireless communicating unit 40 substantially handles only the radio wave transmitted by the portable terminal 2 located within 500 meters. The digital copying machine 1 detects the intensity of the received radio wave for the portable terminal 2 located within 500 meters from the digital copying machine 1. The digital copying machine 1 calculates the distance between the portable terminal 2 and the digital copying machine based on the detected intensity.

The received radio wave contains identification information. For example, the identification is a telephone numbers to identify the portable terminal 2. The digital copying machine 1 identifies the portable terminal 2 based on the telephone number. More preferably, the digital copying machine 1 stores a correspondence table that shows the corresponding relation between a portable terminal 2 and a user that owns the portable terminal 2. In this case, it is possible to determine the user who owns the particular portable terminal 2 based on the received radio wave.

Figure 4:
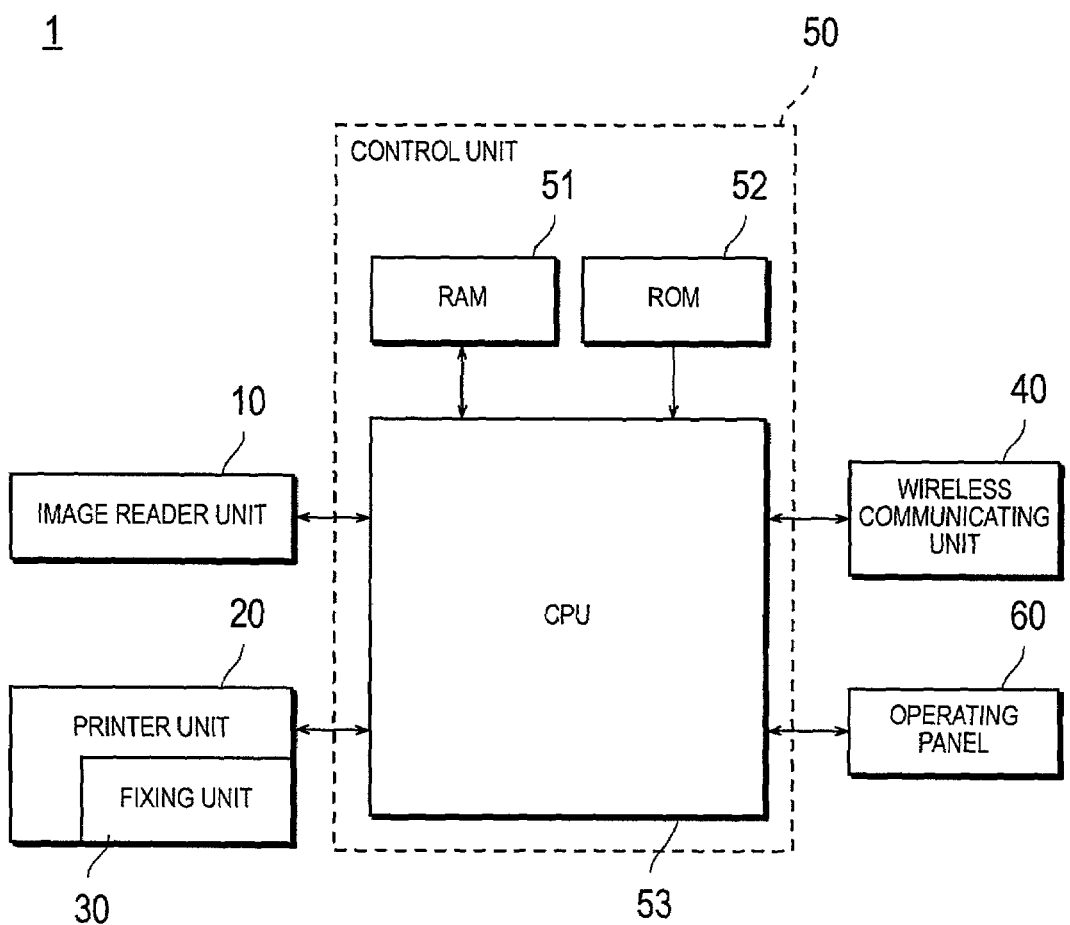
FIG. 4 is a block diagram showing the schematic constitution of the digital copying machine shown in FIG. 2.

FIG. 4 is a block diagram showing the schematic constitution of the digital copying machine shown in FIG. 2, in particular, the constitution of the control unit 50. The control unit 50 is a controller. The control unit 50 is provided with a RAM 51, a ROM 52 and a CPU 53. FIG. 5 is an example of a usage frequency table stored in the RAM 51. FIG. 6 is an example of the first table stored in the ROM 52. FIG. 7 is an example of the second table stored in the ROM 52.

The RAM 51 stores the usage frequency table shown in FIG. 5. The usage frequency table stores for each portable terminal 2 the information about the portable terminal 2, the information about the user (owning-user) who owns the terminal 2, and the number of times the identification information about the terminal 2 is obtained ("usage frequency") with the use of the digital copying machine 1 by the user. The information about the portable terminal 2 and the information about the owning user of the portable terminal 2 are preregistered. The usage frequency is updated each time when the terminal 2 is within a predetermined distance from the digital copying machine 1 and also the digital copying machine 1 is used. Preferably, the predetermined distance is a distance within which the user carrying the portable terminal 2 can physically access and operate the operating panel of the digital copying machine 1, for example, 3 meters.

The ROM 52 stores control programs for the image reader unit 10, the printer unit 20, and other units, as well as the first table and the second table.

The first table shown in FIG. 6 shows the corresponding relation between the distance from the portable terminal 2 to the digital copying machine 1 and the intensity of the receiving radio wave. According to the first table, if the intensity of the receiving radio wave is 0.4 to 1.1 mW, the distance between the portable terminal 2 and the digital copying machine 1 is 3 to 5 meters. Therefore, it is possible to obtain the distance between a particular portable terminal 2 and the digital copying machine 1 by referencing the first table. The content of the first table shown in FIG. 6 is just an example, and the invention is not limited to this content.

The second table shown in FIG. 7 stores the corresponding relation between the distance from the portable terminal 2 to the digital copying machine 1 and the temperature of the fusing roller 31 to be controlled to when the distance is obtained. According to the second table, if the distance between the portable terminal 2 and the digital copying machine 1 is 5 to 10 meters, the temperature of the fusing roller 31 is controlled to 100° C. The second table shown in FIG. 7 is prepared assuming that the appropriate temperature for fixing the toner on the printing paper, i.e., the fusing temperature is 145° C. Therefore, it goes without saying that the content of the second table becomes different if the fusing temperature is different.

The CPU 53 controls the entire operation of the image reader unit 10 and the printer unit 20 in accordance with the input signal coming from the operating panel 60 and the control program stored in the ROM 52. The CPU 53 controls the temperature of the fusing roller 31 in accordance with the distance between the portable terminal 2 and the digital copying machine 1.

Figure 8:
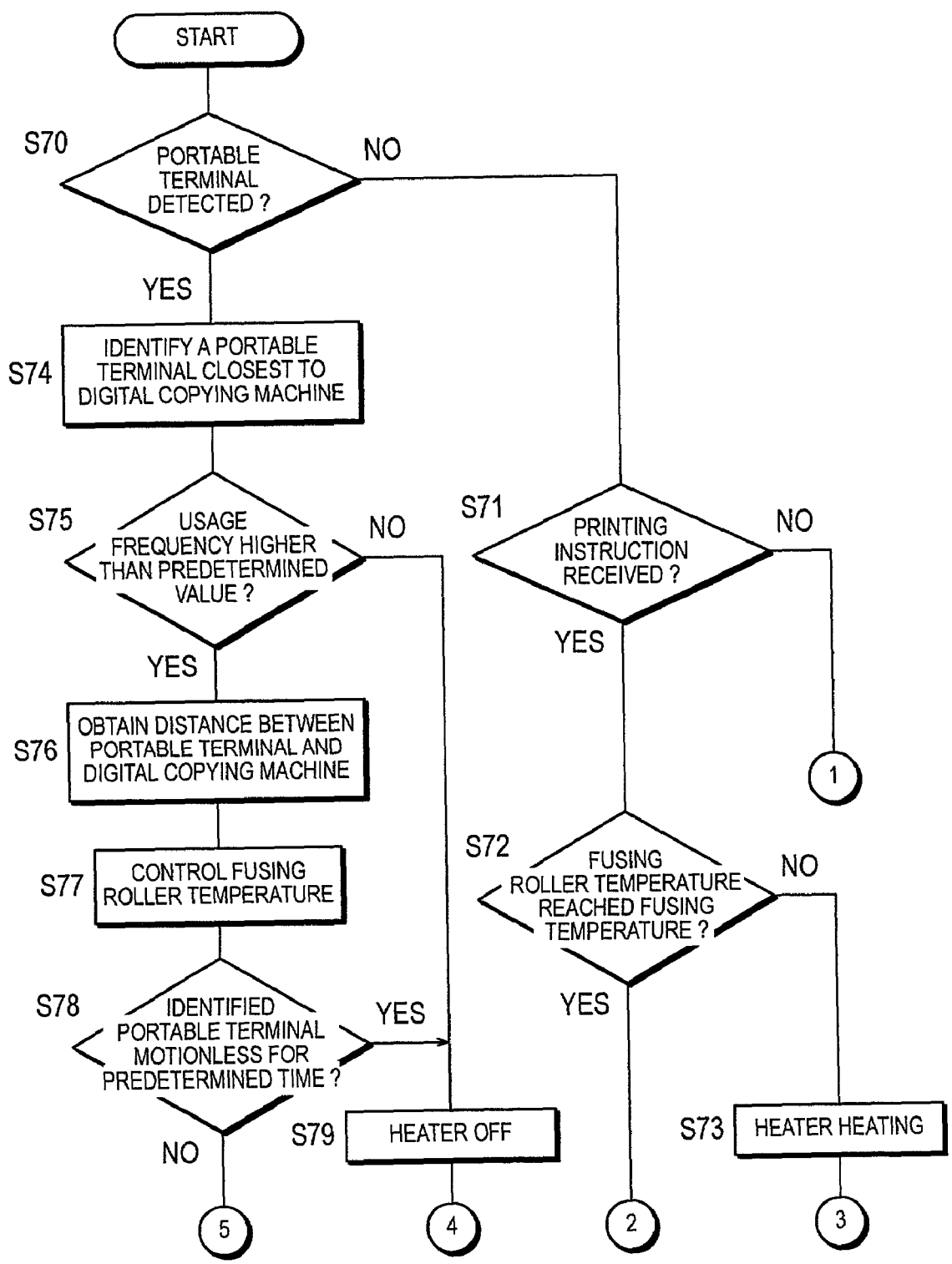
FIG. 8 is a flowchart showing the operation of a digital copying machine corresponding to the first embodiment.
Figure 9:
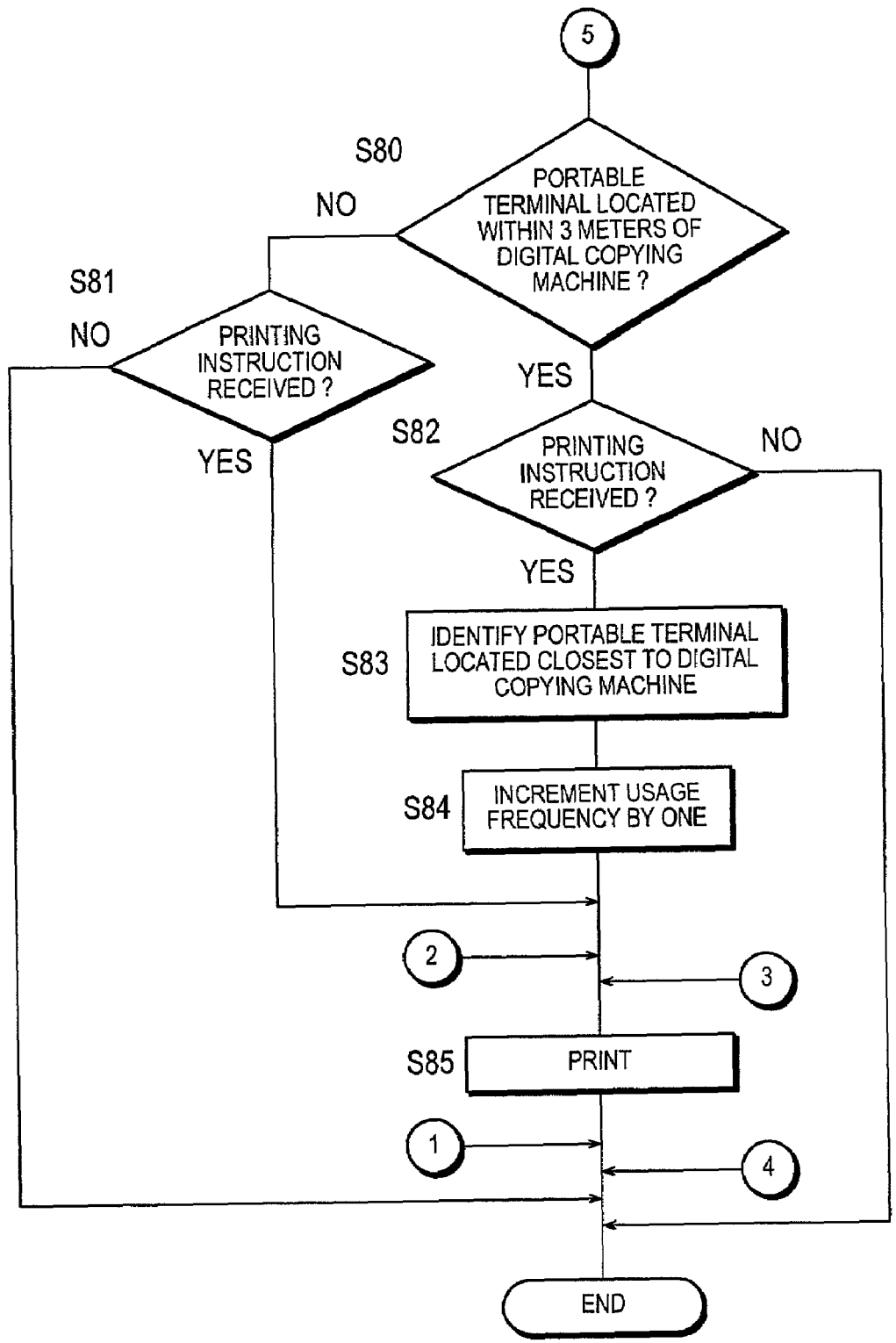
FIG. 9 is a flowchart that continues from FIG. 8.

Next, the process sequence for controlling the digital copying machine 1 with the CPU 53 will be described. FIG. 8 and FIG. 9 represent the flow charts indicating the operation of the digital copying machine 1. The process sequence of the flow chart shown in FIG. 8 and FIG. 9 is stored in the ROM 52 of the digital copying machine 1 as a control program and is executed by the CPU 53.

The step S70 determines whether the portable terminal 2 is detected. This judgment is made based on whether the radio wave from the portable terminal 2 received by the wireless communication unit 40 is above the specified intensity level. If the portable terminal 2 is detected (S70: Yes), the process goes to the step S74. If the portable terminal 2 is not detected (S70: No), the process goes to the step S71.

At the step S71, a judgment is made whether the printing instruction is received from the operating panel 60 of the digital copying machine 1. If the printing instruction is received (S71: Yes), the process goes to the step S72. If the printing instruction is not received (S71: No), the process is terminated immediately.

At the step S72, a judgment is made whether the temperature of the fusing roller 31 reaches the fusing temperature. If the temperature of the fusing roller 31 reaches the fusing temperature (S72: Yes), the printing process is executed at the step S85 in FIG. 9. On the other hand, if the temperature of the fusing roller 31 does not reach the fusing temperature (S72: No), the process goes to the step S73. At the step S73, the heater heats the fusing roller 31 until the temperature of the fusing roller 31 reaches the fusing temperature.

At the step S74, when there are multiple portable terminals 2 that are in communicable conditions, a portable terminal 2 located closest to the digital copying machine 1 among multiple portable terminals 2 is identified. More specifically, if multiple radio waves are detected, the identification information contained in the received radio wave with the strongest intensity is obtained. The preferred portable terminal 2 is identified on the basis of the identification information.

At the step S75, a judgment is made how frequently the digital copying machine 1 is used by the user who owns the portable terminal 2 identified in the above. The judgment is made based on the usage frequency written on the usage frequency table stored in the RAM 51. The usage frequency is the number of times the identification information is obtained. If the usage frequency is high, in other words, if the usage frequency is equal to or higher than a predetermined standard frequency (S75: Yes), the process goes to the step S76. On the other hand, if the usage frequency is low, i.e., the usage frequency is lower than the predetermined frequency (S75: No), the process goes to the step S79.

At the step S76, the distance between the digital copying machine 1 and the portable terminal 2 identified by the step S74 is obtained by referencing the first table stored in the ROM 52.

At the step S77, the power saving control for the digital copying machine 1 is performed in accordance with the distance between the portable terminal 2 and the digital copying machine 1 by referencing the second table stored in the ROM 52. More specifically, the temperature of the fusing roller 31 is controlled.

At the step S78, a judgment is made whether the distance between the portable terminal 2 identified in the step S74 changes in the predetermined time. If no change is occurred in the distance to the portable terminal 2 during the predetermined time (S78: Yes), the process goes to the step S79. If the distance to the identified terminal 2 changes during the predetermined time (S78: No), the process goes to the step S80 in FIG. 9.

At the step S79, the power supply to the heater 33 is controlled to the OFF state, because the possibility of using the digital copying machine 1 is low.

At the step S80 in FIG. 9, a judgment is made whether the portable terminal 2 is located within 3 meters of the digital copying machine 1. In other words, a judgment is made whether there is a user carrying a portable terminal 2 within the range of accessing and operating the digital copying machine 1. If the portable terminal 2 is not located within 3 meters of the digital copying machine 1 (S80: No), the process goes to the step S81. If the portable terminal 2 is located within 3 meters of the digital copying machine 1 (S80: Yes), the process goes to the step S82.

At the step S81, a judgment whether the printing instruction is received from the operating panel of the digital copying machine 1. If a printing instruction is received (S81: Yes), the process goes to the step S85. If a printing instruction is not received (S81: No), the process is immediately terminated.

At the step S82, a judgment is made whether the printing instruction is received from the operating panel of the digital copying machine 1. If a printing instruction is received (S82: Yes), the process goes to the step S83. If a printing instruction is not received (S82: No), the process is immediately terminated.

At the step S83, a portable terminal 2 closest to the digital copying machine 1 is identified. The method of identification is similar to the case in the step S74.

At the step S84, the usage frequency written on the usage frequency table is incremented by one for the portable terminal 2 identified in the step S83. In the present embodiment, if a portable terminal 2 exists within 3 meters of the digital copying machine 1 and a printing instruction is received, it is considered that the user who is owning the closest portable terminal 2 uses the digital copying machine 1. In the step S85, the digital copying machine 1 performs printing in accordance with the received printing instruction.

As explained in the above, the temperature of the fusing roller 31 is controlled in accordance with the distance between the portable terminal 2 and the digital copying machine 1 in the first embodiment. Therefore, the user can use the copying machine 1 without waiting for long time until the digital copying machine 1 becomes ready to start the printing operation. Consequently, there is no drop in the efficiency of the printing work. On the other hand, if there is little possibility of the user using the digital copying machine 1, the power consumption amount can be reduced by the power saving control.

Moreover, since it turns off the power supply to the heater if the distance between the digital copying machine 1 and the portable terminal 2 does not change after the predetermined time, power saving can be achieved as well.

The first embodiment is described in the above, but the present invention is not limited to it. For example, although the portable terminal 2 located closest to the digital copying machine 1 is identified based on the communication result with the portable terminal and the power saving control is performed in accordance with the distance between the identified portable terminal 2 and the digital copying machine 1 in the step S74, the present invention is not limited to that. For example, multiple portable terminals that are in communicable conditions, preregistered user's portable terminal can be identified so that the power saving control can be implemented corresponding to the distance between the identified portable terminal 2 and the digital copying machine 1.

Moreover, although the usage frequency is judged referencing the frequency table of the digital copying machine 1 in the step S75, the present invention is not limited to that. It is possible to store the information of the usage frequency in the portable terminal 2, transfer this information to the digital copying machine 1, and let the digital copying machine 1 make a judgment on the usage frequency based on this information.

In the step S83, the system detects the portable terminal 2 that exists within 3 meters and considers that the user who owns the detected portable terminal 2 used the digital copying machine 1. However, the present invention is not limited to it. For example, it can be so configured that the portable terminal 2 issues a specific signal when the user operates the portable terminal 2. With such a configuration, the system considers that the user uses the digital copying machine 1 if the copying machine 1 receives the specific signal.

Moreover, the power supply to the heater is turned off if the detected portable terminal does not move for the predetermined time (step S78: Yes) in this embodiment, the portable terminals 2 that does not move can be eliminated from the target to be identified if multiple portable terminals are detected. In this case, the target portable terminal is identified among multiple portable terminals moving. The temperature of the fusing unit is controlled in accordance with the distance between the identified portable terminal and the digital copying machine 1. Preferably, the temperature is controlled in accordance with the distance between the digital copying machine and the closest portable terminal. The power consumption can be further reduced if only the moved portable terminals are considered as the objects of identification.

It is also possible to review the usage history of the digital copying machine and eliminate all the portable terminals whose usage frequencies reach the predetermined usage frequency from the objects of identification. Moreover, the portable terminals that move in the direction furthering from the digital copying machine 1 can be eliminated from the objects of identification, because there is little possibility for a user who moved away from the digital copying machine is going to use the digital copying machine 1.

On the contrary, it is also possible to identify a portable terminal located closest to the digital copying machine regardless of whether the portable terminal moves and control the temperature of the fusing unit only in accordance with the distance between the identified portable terminal and the digital copying machine 1.

Although the distances of terminals that are located within 500 meters from the digital copying machine are obtained for evaluation in the above description, the invention is not limited to that. It can also be configured to obtain and evaluate digital copying machines that are more than 500 meters away from the digital copying machines.

(Embodiment 2)

The second embodiment is a case where the present invention is applied to an image forming system having a computer and a printer. In this embodiment, when the user carrying a portable terminal approaches the computer, the power saving control is performed in accordance with the distance between the computer and the portable terminal.

Figure 10:
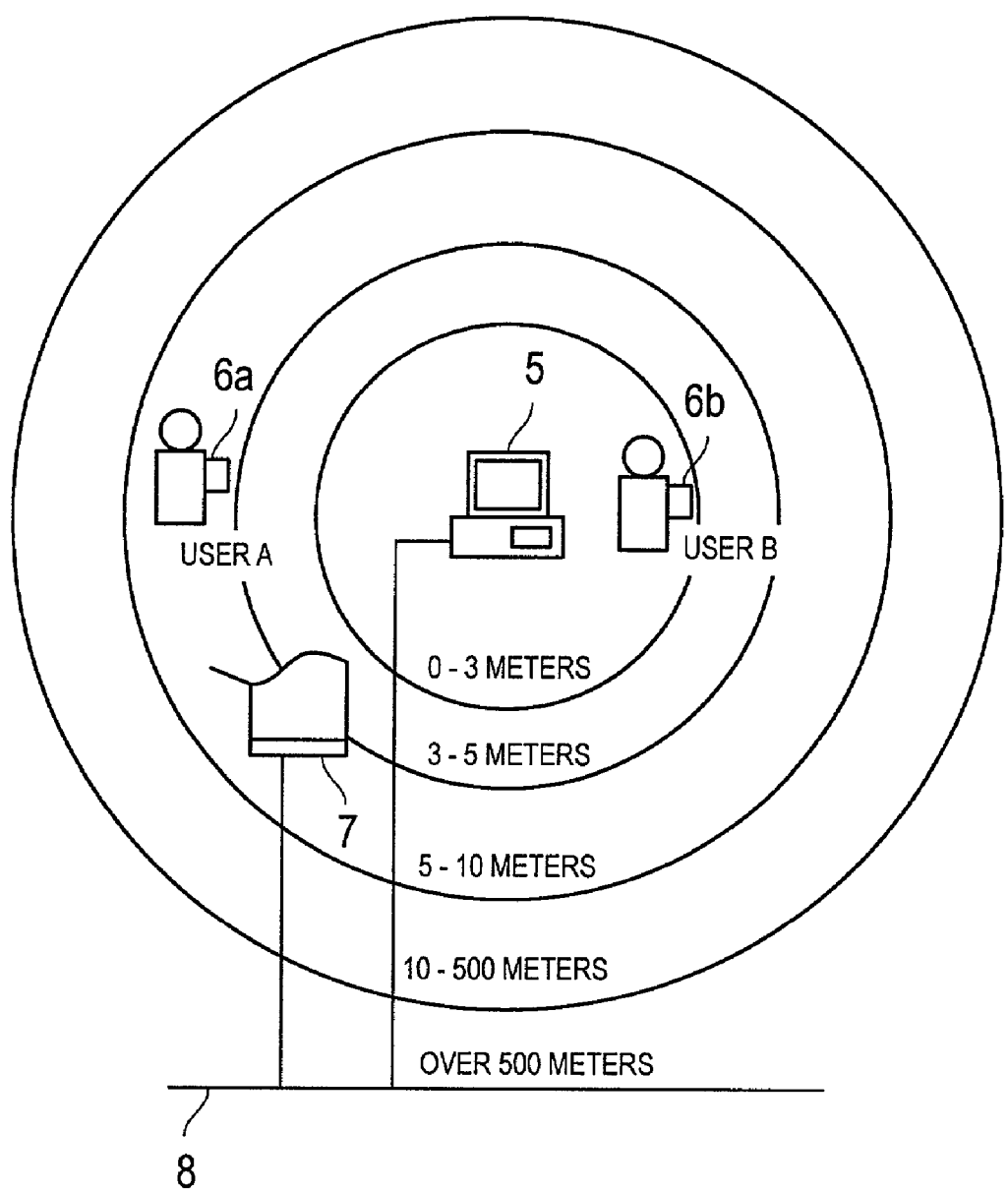
FIG. 10 is a diagram showing an example operating condition of a system having a computer and a printer in the second embodiment.

FIG. 10 is a diagram showing the operating condition of the system having a computer 5 and a printer 7.

The computer 5 is capable of wirelessly communicating with portable terminals 6*a* through 6*b*. A reference number 6 in the following description denotes an arbitrary portable terminal. The function of the portable terminal 6 will not be described here, as it is essentially the same as the function of the portable terminal 2 described in the first embodiment.

As shown in FIG. 10, the user A has a portable terminal 6*a* and the user B has a portable terminal 6*b*. The portable terminal 6*a* of the user A is registered in the computer 5 in advance. More specifically, the telephone number of the portable terminal 6*a* is preregistered as identification information. The user A is located 5 to 10 meters away from the computer 5. The user B is located 0 to 3 meters away from the computer 5.

The printer 7 has a pair of fusing rollers and a heater provided on the fusing roller. A temperature sensor detects the temperature of the fusing roller. The printer 7 is connected to the computer 5 via a network 8. The computer 5 controls the printer 7.

Figures 11, 12:
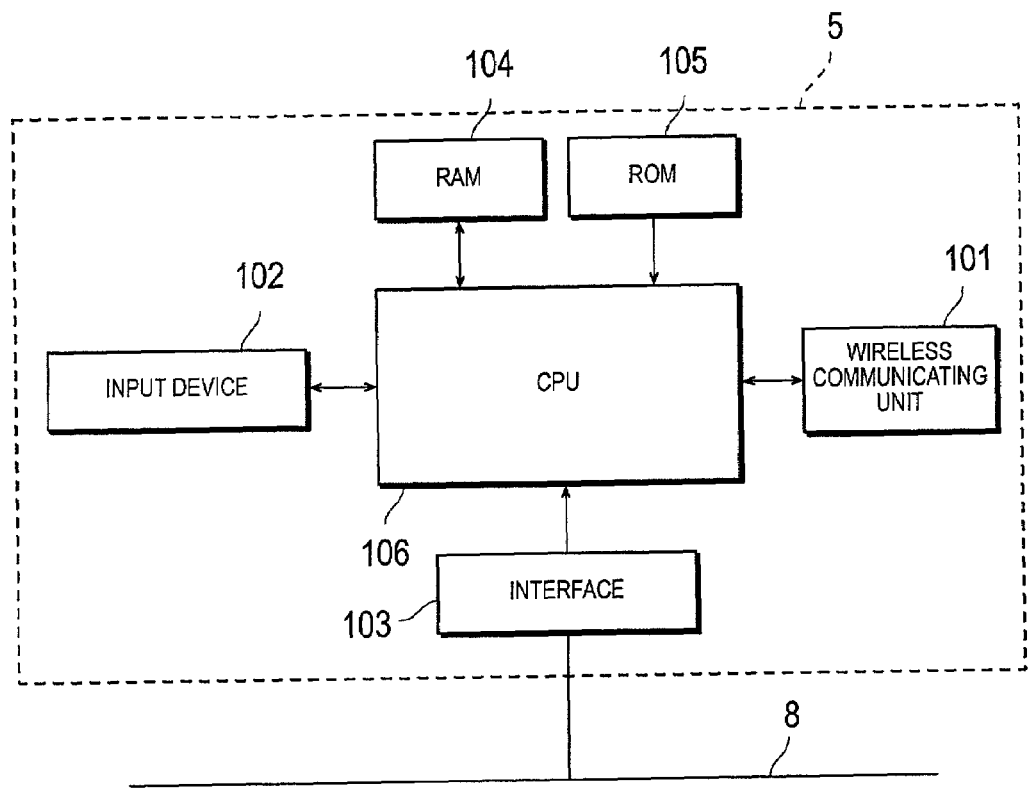
FIG. 11 is a block diagram showing the schematic constitution of the computer shown in FIG. 10.
FIG. 12 is a table showing the usage frequency stored in the RAM shown in FIG. 11.

FIG. 11 is a block diagram showing the schematic constitution of the computer 5.

The computer 5 has a wireless communication unit 101, an input device 102, an interface 103, a RAM 104, a ROM 105, and a CPU 106.

FIG. 12 is a table showing the usage frequency stored in the RAM 104, FIG. 13 is the third table stored in the ROM 105, and FIG. 14 is the fourth table stored in the ROM 105.

The wireless communication unit 101 will not be described here, as it is essentially the same as the wireless communication unit 40 shown in FIG. 3. The input device 102 includes a keyboard and/or a mouse. The user uses the input device 102 for entering instructions to the computer. The interface 103 is connected to the outside equipment via the network 8. The interface 103 enables the computer 5 to communicate with the outside equipment.

The RAM 104 stores a usage frequency table shown in FIG. 12. The usage frequency table stores the information about the user (owner) who uses the computer 5, the information about the portable terminal 6 owned by the user, and the information of the number of times the printer 7 is used by the computer 5. The information about the user and the portable terminal 6 is preregistered. The usage frequency of the printer 7 is updated each time when a printing instruction of printer 7 is issued from the user to the printer 7.

The ROM 105 stores the third table shown in FIG. 13 and the fourth table shown in FIG. 14. The third table has contents approximately equal to that of the first table shown in FIG. 6. The third table stores the corresponding relation between the distance from the portable terminal 6 to the computer 5 and the intensity of the received radio waves. The fourth table has contents approximately equal to those of the second table shown in FIG. 6. The fourth table stores the corresponding relation between the distance from the portable terminal 6 to the computer 5 and the temperature of the fusing roller to be controlled to when the distance is obtained. It goes without saying that the contents of the third table and the fourth table shown in FIG. 13 and FIG. 14 are examples, and the invention is not limited to those contents.

The CPU 106 performs the power saving control for the printer 7 in accordance with the distance between the portable terminal 6 and the computer 5. The CPU 106 controls the temperature of the fusing roller provided in the printer 7 in accordance with the distance between the portable terminal 6 and the computer 5.

Figure 15:
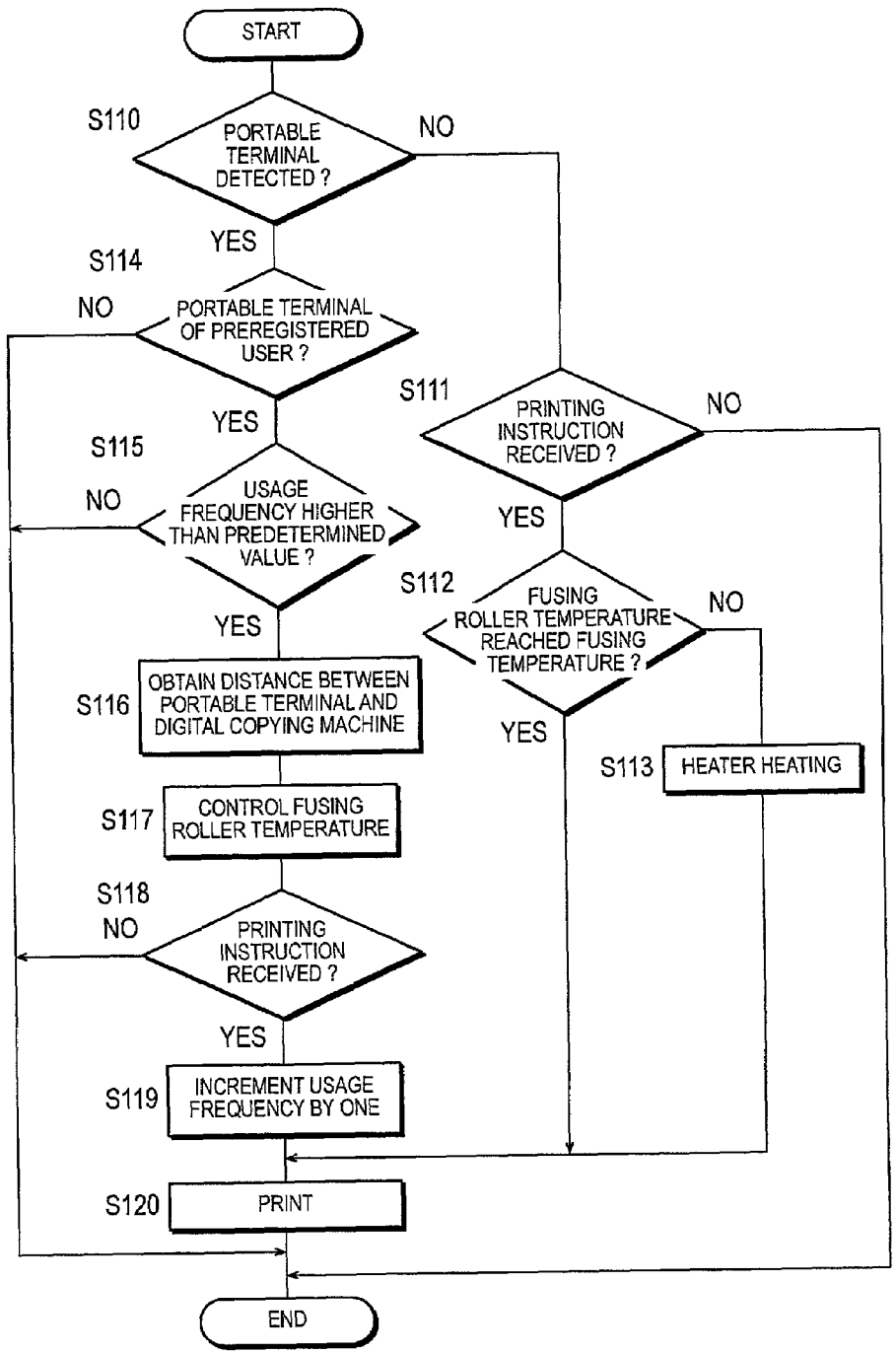
FIG. 15 is a flowchart showing the computer operation corresponding to the second embodiment.

The sequence of control by the CPU 106 for the printer 7 will be described in the following. FIG. 15 is a flow chart showing the operation of the computer 5 corresponding to the second embodiment. The process sequence shown in FIG. 15 is stored in the ROM 105 of the computer 5 as a control program and is executed by the CPU 106.

The step S110 determines whether the portable terminal 6 is determined. This judgment is made based on whether the radio wave from the portable terminal 6 received by the wireless communication unit 101 is above the specified intensity level. If the portable terminal 6 is detected (S10: Yes), the process goes to the step S114. If the portable terminal 6 is not detected (S110: No), the process goes to the step S111.

At the step S111, a judgment is made whether the printing instruction is entered into the computer 5. If the printing instruction is entered (S111: Yes), the process goes to the step S112. If the printing instruction is not entered (S111: No), the process is terminated immediately.

At the step S112, a judgment is made whether the printer 7 is ready for printing, i.e., whether the temperature of the fusing roller reaches the fusing temperature. The computer 5 receives from the printer 7 the information about the fusing roller temperature detected by the temperature sensor of the printer 7. A judgment is made based on the received information. If the temperature of the fusing roller 31 reaches the fusing temperature (S112: Yes), the process goes to the step S120. On the other hand, if the temperature of the fusing roller 31 does not reach the fusing temperature (S112: No), the process goes to the step S113. At the step S113, the heater heats the fusing roller 31 of the printer 7 until the temperature of the fusing roller 31 reaches the fusing temperature.

At the step S114, a judgment is made whether the detected portable terminal 6 is the portable terminal 6 of the owner of the computer 5, i.e., whether the detected portable terminal 6 is the portable terminal 6 of the preregistered user. If multiple portable terminals 6 are detected in this case, a judgment is made whether the portable terminal 6 of the preregistered user can be found among the multiple portable terminals. The above judgment is made by comparing the identification information issued by the portable terminal 6 with the information of the portable terminal 6 stored in the usage frequency table. If the detected portable terminal 6 is found to be the preregistered portable terminal 6 (S114: Yes), the process goes to the step S115. If the detected portable terminal 6 is different from the portable terminal 6 of the preregistered user, the process is terminated immediately.

At the step S115, a judgment is made whether the computer 5 is frequently issuing printing instructions to the printer 7. More specifically, if the frequency of the printing instructions issued is higher than a predetermined standard frequency (S115: Yes), the process goes to the steps S116. If the frequency of the printing instructions issued is lower than a predetermined standard frequency (S115: No), the process is terminated. The frequency of the printing instructions is judged based on the frequency written in the usage frequency table.

At the step S116, the distance between the portable terminal 6 and the computer 5 obtained from the intensity of the received radio waves referencing the third table stored in the ROM 105.

At the step S117, the temperature of the fusing roller 31 of the printer 7 is controlled in accordance with the distance between the portable terminal 6 and the computer 5 referencing the fourth table stored in the ROM 105.

At the step S118, a judgment is made whether the printing instruction is received from the user. If the printing instruction is received (S118: Yes), the process goes to the step S119. If the printing instruction is not received (S118: No), the process is terminated immediately.

At the step S119, the usage frequency written on the usage frequency table is incremented by one. At the step S120, the computer 5 causes the printer 7 to execute printing.

As described in the above, the temperature of the fusing rollers of the printer 7 is controlled in accordance with the distance between the portable terminal 6 and the computer 5 that controls the printer 7. Therefore, when the user goes to the user's computer 5 to instruct the printer to print, no efficiency reduction occurs in the printing work itself, and the power consumption can be reduced when the user is away from the computer 5.

Although a case of having only one computer 5 in the present embodiment, the invention is not limited to this case.

The printer 7 can be connected to multiple computers. In such a case, each computer is assigned to a user. The portable terminal of the user preregistered in each computer is identified from multiple portable terminals under wirelessly communicable conditions.

If multiple printers are connected to a computer, it is possible to control only a printer having high usage frequency. Moreover, it is possible that the system changes the contents of the power saving control in accordance with the usage frequencies of the printers. As a consequence, the controlled temperature of the heater can be varied in accordance with the usage frequency of the printer.

Figure 16:
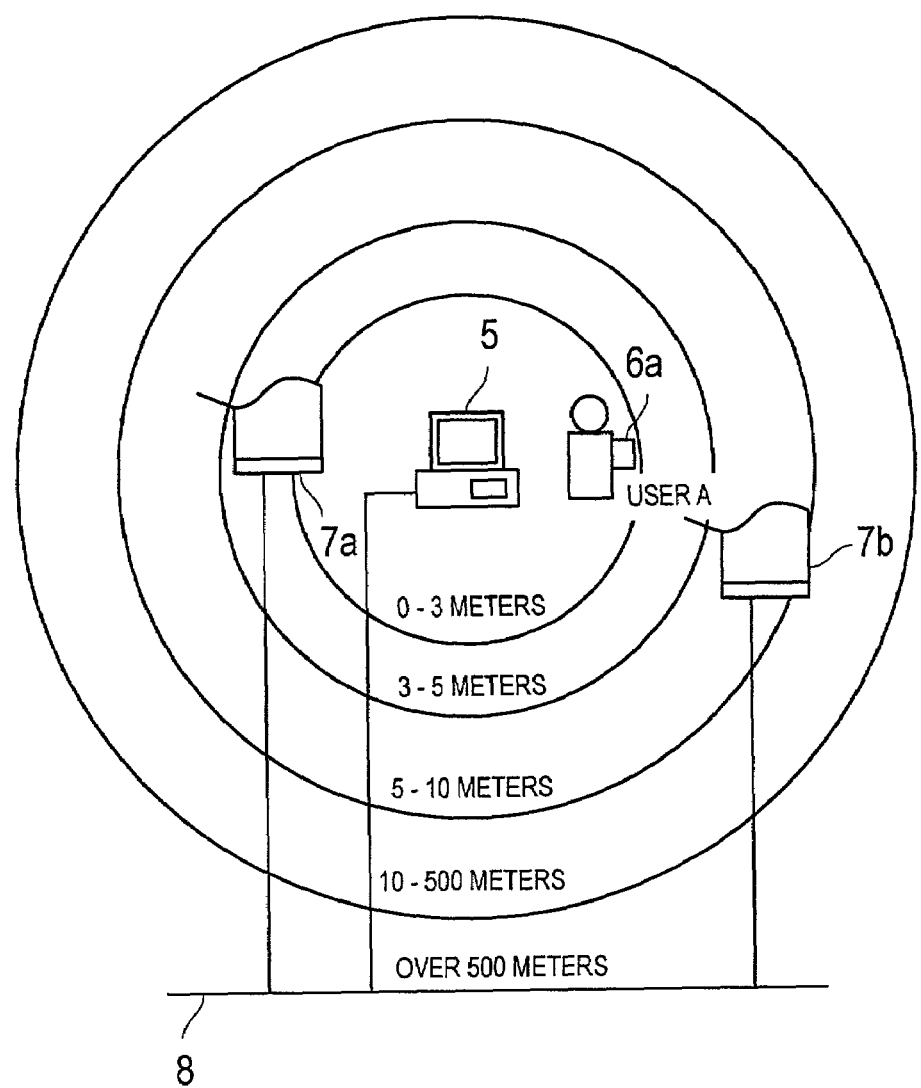
FIG. 16 is a diagram showing an example operating condition of a modified system in the second embodiment.
Figures 17, 18:
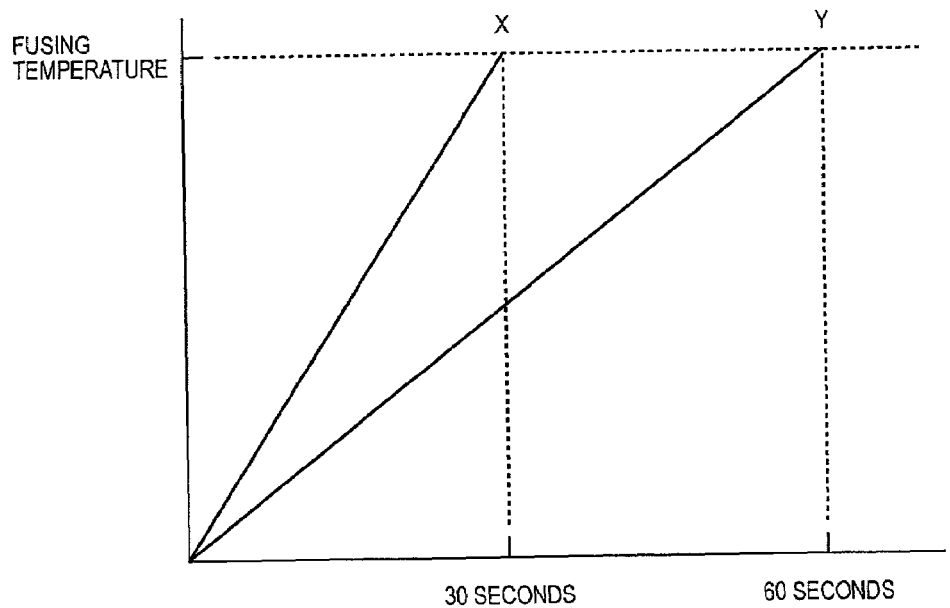
FIG. 17 is a modified the fourth table.
FIG. 18 is a diagram showing a relation between the time required for reaching the fusing temperature and fusing unit temperature.

For example, it is assumed that a printer 7a is positioned at a point 2 meters away from the computer 5, while another printer 7b is positioned at a point 8 meters away from the computer 5 as shown in FIG. 16. Also it is assumed that the user A often instructs the printer 7a to print from the user's own computer 5, while the user rarely instructs the printer 7b to print. In this case, the fourth table can be divided into finer categories per printer as shown in FIG. 17. The temperature control can then be varied between the printers 7a and 7b of different usage frequencies based on this finely divided fourth table. In this case, there is no need to apply the same control to the printer 7b of a lower usage frequency as to the printer 7a of a higher usage frequency. Thus, the power consumption amount can be reduced.

Moreover, although it is shown in this embodiment that the distance between the portable terminal 6 and the computer 5 is always obtained, the invention is not limited to it. It is possible to obtain the distance between the portable terminal and the computer only when the user issues a specific signal from the portable terminal.

Further, the time required for the fusing roller to reach the fusing temperature can be adjusted in accordance with the distance between the portable terminal and the computer. In this case, the relation between the temperature and the time required for the fusing temperature to be reached can be, for example, as shown in FIG. 18. In FIG. 18, the horizontal axis is time and the vertical axis is the temperature of the fusing roller. The solid line X represent the relation between the temperature and the time when the distance between the portable terminal and the computer is 5 meters, and the solid line Y represents the relation between the temperature and the time when the distance between the portable terminal and the computer is 10 meters. The time required for the fusing temperature to be reached is shorter in case of the solid line X. The heater's power consumption can be reduced since intense heating is avoided by varying the time spent for heating the roller to reach the fusing temperature in accordance with the distance.

Furthermore, although it is shown in this embodiment that the preregistered portable terminal 6 is identified from multiple portable terminals and the power saving control for the printer 7 is executed in accordance with the distance between the portable terminal 6 and the computer 5, the present invention is not limited to it.

For example, the computer may identify the preregistered portable terminal 6 from multiple portable terminals that are under wirelessly communicable conditions. In this case, the computer obtains the distance between the identified portable terminal 6 and the printer or the digital copying machine.

Although it is described that the distance is obtained by means of wireless communication between the portable terminal and the digital copying machine, or the portable terminal and the computer, the invention is not limited to it. The digital copying machine, the printer or the computer stores its position information in advance. The position information is compared with the position of the portable terminal to obtain the distance between them. In this case, the position of the portable terminal is detected through wireless communication between the portable terminal and preinstalled three antennas.

Any arbitrary device capable of communicating with the digital copying machine and/or the computer can replace the portable terminal used in each of the embodiments above.

Moreover, although the temperature control of the fusing unit is used as a means of the power saving control in each of the embodiments above, the present invention is not limited to it. It is possible to control a component, which takes time to start up, or a component, which takes time to be stabilized, in accordance with the distance between the portable terminal and the device. For example, the power saving control includes the control of the stability of the polygon motor rotation in the laser beam optical system in accordance with its distance from the portable terminal.

In each of the above embodiments, the CPU performs the heater temperature control by executing the control programs described in the processing sequence shown in FIG. 8, FIG. 9 and FIG. 15. These control programs can be provided as application software stored in a computer readable recording medium (such as a flexible disk or CD-ROM).

The invention maybe embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An image forming system comprising portable terminals and an image forming device, wherein
    said portable terminals are each equipped with a wireless communication unit capable of wirelessly communicating with said image forming device; and
    said image forming device comprises:
        a wireless communication unit capable of wirelessly communicating with said portable terminals;
        an identifying unit for identifying a portable terminal located closest to the image forming device out of portable terminals under wirelessly communicable conditions; and
        a power saving control unit for performing power saving control for said image forming device in correspondence with the distance between the identified portable terminal and said image forming device.

2. The image forming system according to claim 1, wherein
    said identifying unit eliminates one or more portable terminals that do not move for a predetermined time from objects of identification.

3. The image forming system according to claim 1, wherein
    said identifying unit eliminates one or more portable terminals that move in directions away from said image forming device from objects of identification.

4. The image forming system according to claim 1, wherein
    said identifying unit has a usage history recognizing component for recognizing usage history of said image forming device for each portable terminal and eliminates one or more portable terminals whose usage frequencies do not reach a predetermined usage frequency from objects of identification.

5. An image forming device comprising:
a communication unit for communicating wirelessly with a portable terminal; and
a controller executing the steps of:
obtaining distance between said portable terminal and said image forming device based on result of communication performed by said communication unit, and
performing power saving control for said image forming device in accordance with the obtained distance, wherein
said communication unit is capable of communicating with multiple portable terminals;
said controller identifies a portable terminal located closest to the image forming device out of multiple portable terminals under conditions wirelessly communicable with said communication unit and performs power saving control for said image forming device in accordance with the distance between the identified portable terminal and said image forming device.

6. The image forming device according to claim 5, wherein
said controller eliminates one or more portable terminals that do not move for a predetermined time from objects of identification.

7. The image forming device according to claim 5 further comprising a fusing unit, wherein
said power saving control is temperature control for said fusing unit.

8. A control method for an image forming device comprising:
1) wirelessly communicating with a portable terminal;
2) obtaining distance between said portable terminal and said image forming device based on said communication result; and
3) performing power saving control for said image forming device in accordance with the distance obtained in said step 2), wherein
said step 1) comprises communicating with multiple portable terminals; and
said step 2) comprises identifying a portable terminal located closest to the image forming device out of multiple portable terminals under wirelessly communicable conditions, and obtaining distance between the identified portable terminal and said image forming device.

9. The control method according to claim 8, wherein
said step 2) comprises eliminating one or more portable terminals that do not move for a predetermined time from objects of identification.

10. The control method according to claim 8, wherein
said image forming device has a fusing unit; and
said power saving control is temperature control for said fusing unit.

11. A computer program stored on a computer readable medium for an image forming device, wherein
said program causes a computer to execute the steps of:
1) wirelessly communicating with a portable terminal;
2) obtaining distance between said portable terminal and said image forming device based on said communication result; and
3) performing power saving control for said image forming device in accordance with the distance obtained in said step 2), wherein
said step 1) comprises communicating with multiple portable terminals; and
said step 2) comprises identifying a portable terminal located closest to the image forming device out of multiple portable terminals under wirelessly communicable conditions, and obtaining distance between the identified portable terminal and said image forming device.

12. The control program according to claim 11, wherein
said step 2) comprises eliminating one or more portable terminals that do not move for a predetermined time from objects of identification.

13. The control program according to claim 11, wherein
said image forming device has a fusing unit; and
said power saving control is temperature control for said fusing unit.

14. An image forming system comprising multiple image forming devices, portable terminals and a control device for controlling said image forming device, wherein
said portable terminals are each equipped with a wireless communication unit capable of wirelessly communicating with said control device; and
said control device comprises:
a wireless communication unit capable of wirelessly communicating with said multiple portable terminals;
an identifying unit for identifying a portable terminal of a preregistered user out of portable terminals under wirelessly communicable conditions; and
a power saving control unit for performing power saving control for said image forming device in correspondence with the distance between the identified portable terminal and said image forming device, wherein said power saving control unit provided in said control device changes said power saving control's contents in accordance with each image forming device's usage frequency.

15. The image forming system according to claim 14, wherein
said image forming device comprises a fusing unit; and
said power saving control is temperature control for said fusing unit.

* * * * *